May 28, 1963  R. E. SCHOENEMAN  3,091,408
VACUUM BUFFER LOOP DEVICE FOR TAPE HANDLERS
Filed July 22, 1960  2 Sheets-Sheet 1

INVENTOR.
ROBERT E. SCHOENEMAN
BY Alfred W. Barber
ATTORNEY

Patented May 28, 1963

3,091,408
VACUUM BUFFER LOOP DEVICE FOR
TAPE HANDLERS
Robert E. Schoeneman, Port Washington, N.Y., assignor to Potter Instrument Company, Inc., Plainview, N.Y., a corporation of New York
Filed July 22, 1960, Ser. No. 44,737
7 Claims. (Cl. 242—55.12)

The present invention concerns tape handlers and, in particular, vacuum buffer loop devices for tape handlers.

Magnetic tape is widely used for recording information in computing systems. In this application it is usually necessary to reach various points along the length of the tape quickly. This in turn requires frequent and rapid reversals of direction of the motion of the tape. Usually the tape is carried on two reels and passes from one to the other and back again. When reversal is required, a system having considerable inertia must be decelerated in one direction and accelerated in the opposite direction. A portion of the tape representing a much smaller mass may, however, be decelerated or accelerated much more rapidly. This fact may be used to practical advantage by maintaining a slack loop between the reels of tape and the point at which the reproducer is located. The slack loop is required to allow reversal of direction of travel of the tape in a very short interval of time and at the same time it must maintain at least a minimum tension across the reproducer. Additional tensioning means will usually be provided between the slack loops and the tape reels as, for example, multiple loop tension arms. In order to establish equilibrium in the system with a predetermined tension on the tape the tension arms may be spring loaded and maintained at a predetermined position by means of a position sensing device operating a servo system controlling the rotation of the tape reels.

It has been found, according to the present invention, that greatly improved characteristics in tape handlers may be provided with certain changes in the vacuum loop chambers and their mode of operation. One feature of the present invention concerns isolating the vacuum systems into two vacuum chambers so that the dynamic conditions on one side of the reproducer do not affect the dynamic conditions on the other side of the reproducer. The point here is that the dynamics in a given vacuum chamber differ greatly depending on the direction of travel of the tape especially in the initial transient stage and if there is coupling between the two chambers, actual shock waves may be communicated from one to the other. Since the object is to present the tape in substantially inertialess state to the reproducer and the tape driving means, cross coupled effects between the two vacuum chambers may limit the maximum rate of reversals obtainable with the system. It has also been found according to the present invention that the pull of the vacuum system on the tape when accomplished in two major components provides optimum conditions for both directions of travel of the tape. In addition it has been found if friction is reduced to practically zero on the tension arm or reel side of the vacuum chambers and made small but definite on the reproducer end of the vacuum chambers that greatly improved operational characteristics are obtained. Friction at most points is undesirable along the tape travel path through the vacuum chambers, and substantial reduction in friction may be accomplished by means of bleed holes for admitting air against the surface of the tape and forming an air film between the tape surfaces and the walls of the vacuum chambers. One considerable and unexpected advantage of the vacuum buffers according to the present invention is that when called for the tape stops extremely quickly without additional braking and thus they may be considered as brakes of a kind.

Accordingly one object of the present invention is to provide vacuum buffer chambers for tape handlers, which chambers have greatly improved operational characteristics.

Another object is to improve the start and stop characteristics of a tape handler.

Still another object is to prevent transient response action of tension arms or tape reels from being transmitted to the record/playback head.

A further object is to raise the rate at which tape may be started or stopped in a tape handling system.

A still further object is to isolate transient response of a tape on one side of the record/playback head from the tape on the other side of the head.

These and other objects will be apparent from the detailed description of the invention given in connection with the various figures of the drawing.

Figure 1:
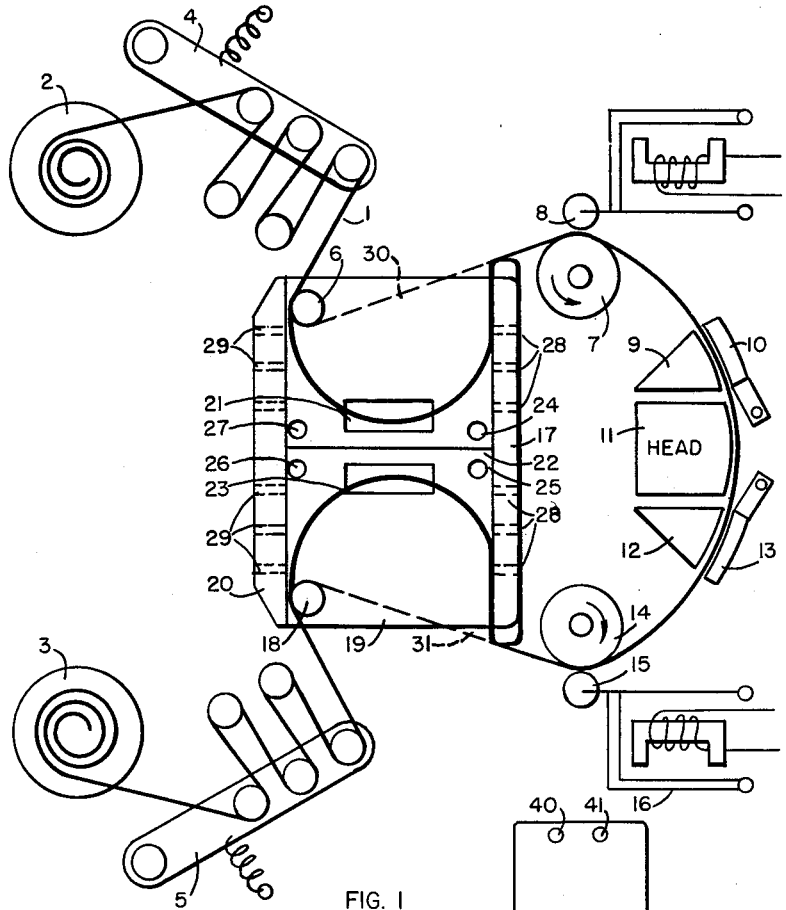
FIG. 1 shows a plan view in simplified form of the preferred form of the present invention.

FIG. 1 shows in simplified form how the device of the present invention is utilized in a tape handling system. A magnetic tape 1 is passed between two storage reels 2 and 3 over a path including tensioning arms 4 and 5, idler rollers 6 and 18, dual vacuum chambers 17—19—20—22, drive capstans 7 and 14, drag pads 9—10 and 12—13 and across record/playback head 11. The tape is pulled by either capstan 7 or 14 depending on which of pinch rollers 8 or 15 is brought into engagement by their respective relays such as relay 16 driving pinch roller 15. When the tape is pulled in either direction, the reels 2 or 3 are driven in the same direction under control of signals derived from the positioning of tension arms 4 and 5. As the tape is pulled, the pull will be increased at one tension arm and decreased at the other. Transducers connected to these tension arms 4 and 5 control the motors driving reels 2 and 3 in such a manner as to tend to restore the tension arms to their initial predetermined positions as will be more fully explained in connection with FIG. 3.

Figure 4:
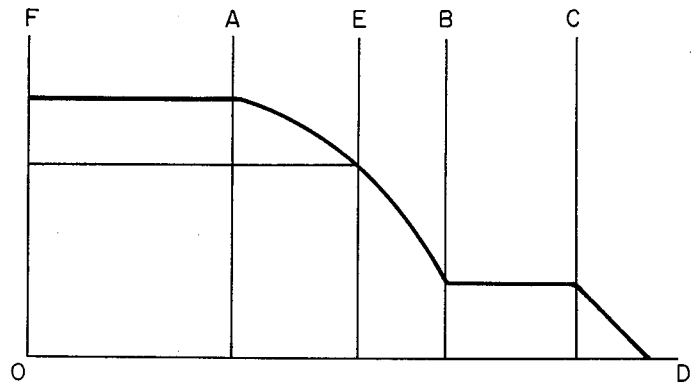
FIG. 4 shows a force diagram useful in explaining the operation of the invention.

The tape, as has been stated above, passes through vacuum chambers 17—19—20—22. These vacuum chambers are essentially five sided compartments being open on one side into which the tape is drawn by the vacuum created by suction applied to ports 21—23—24—25—26—27. Considering the upper chamber, it is formed by a rear plate 19, end plates 17 and 20, intermediate plate 22 and front cover 32 (FIG. 2) which is shown removed in FIG. 1 so that the interior parts and operation may be seen more clearly. This front cover 32 may be attached in any convenient manner as by means of a hinge or screws, not shown, or it may be unattached mechanically since atmospheric pressure in the presence of the vacuum inside the chambers will hold it in place. When the vacuum creating means (FIG. 2) is turned off or the front cover is opened or removed, the tape will move out of the chambers and assume the positions indicated by dotted lines 30 and 31. With the front cover in place, air is drawn from the chambers through ports 21—23—24—25—25—26—27 by means shown in FIG. 2 and the tape is pulled down to normal operating positions as shown. Now it will be seen that the tape in its normal operating positions passes across large ports 21 and 23 in such a manner that air is being drawn out from both sides of the tape. If the tape is pulled in such a manner as to tend to remove it from a chamber, less of the port will be vented and the pull due to the vacuum will increase. On the other hand if the tape is moved in such a way as to tend to decrease its pull, it will tend to move further across the port and the pull will decrease. FIG. 4 shows a curve of force F on the tape vs distance D of penetration of tape in the chambers. The force is seen to be substantially constant up to line A which is the point at which the leading edge of the tape reaches a large port 21 or 23, then to decrease from A to B as the tape passes across the large port after which it experiences a nearly constant small pull from B to C due to suction applied to small ports 24—25—26—27 after which beyond C it drops rapidly to zero as it passes the small ports. The horizontal line intersecting the curve on line E represents the pull of the tension arms or other prior tensioning means. It will be seen that in order to provide stability, i.e. a single intersection of the tension arm pull with the pull of the vacuum system, the initial pull of the vacuum at line F must be greater than the pull of the tension arms. The preferred normal operating point is at or near E. In tape handlers operated under conditions of rapid starts, stops and reversals, the tape in these chambers buffers the tape on the tension arms and reels. The tension arms and reels have higher inertia and hence cannot follow extremely rapid commands for position changes. The tape in passing from the chambers to the tension arms is maintained as friction free as possible as by utilizing idler rollers 6 and 18. The tape in passing from the chambers toward the record/playback head 11 is provided with a small amount of friction as it passes over the stationary ends of plate 17. With the invention the tape may be started, stopped and reversed in extremely short intervals of time and with a much smaller braking force applied by brakes 9—10 and 12—13 than is otherwise possible without the invention. The desired and attained performance with this system is characterized by rapid and smooth starts, stops and reversals free from jitter, rate of motion overshoot or transients such as reflected bumps from the tension arms or reels or longitudinal stretching propagated in a wave motion along the tape.

It has been found that in a vacuum chamber according to the present invention that the vacuum chambers must be isolated from each other as by partition 22 so that changes in pressure in one chamber are not reflected into the other. The vacuum system outside the chambers must be of sufficient capacity not to be affected by changes in loading inside the chambers. In addition it has been found that in a high speed tape handling system there is a tendency for the tape due to static accumulation or other causes to adhere to the walls 17 and 20. At high speeds a slight tendency to adhere at these points will seriously affect the flow of the tape through the chambers. It has been found that a number of small ports 28 and 29 allowing air to enter against the surface of the tape and between it and the walls of the chamber will prevent this tendency to adhere.

Figure 2:
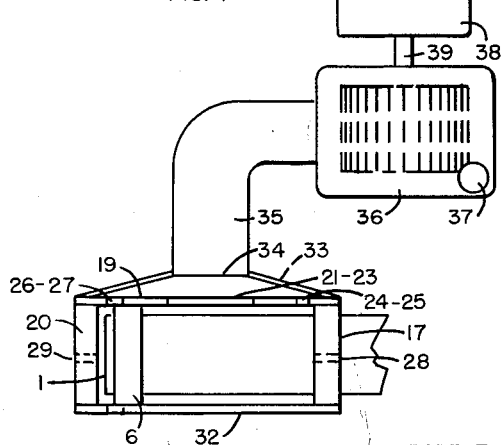
FIG. 2 shows a simplified top view of a portion of the form of the invention shown in FIG. 1.

FIG. 2 shows how a blower 36 with exhaust port 37 and driven by a suitable motor 38 over shaft 39 and receiving power over leads 40—41 may be a source of vacuum over pipe 35 through port 34 to back cover 33 for the vacuum chambers 17—19—20—32. The blower size and speed together with the size of the ports and connecting pipes should be such that a substantial degree of vacuum is established in the vacuum chambers. While not intended to limit the scope of the invention but merely to clarify a vacuum equivalent to a foot of water would be in the range described as substantial.

Figure 3:
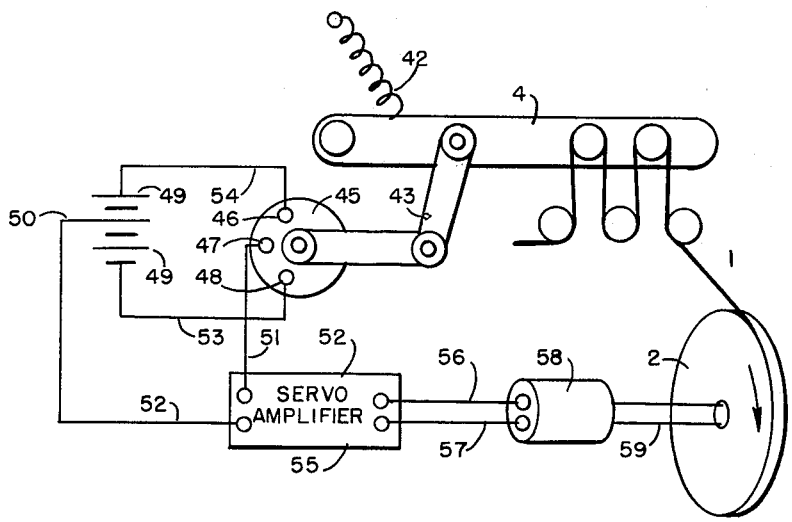
FIG. 3 shows a diagrammatic representation of a portion of the control means utilized in the present invention.

FIG. 3 shows in diagrammatic form how the tape is handled by the tension arms and reels although other means such as large vacuum chambers may be used in place of the tension arms. The reel 2 is driven by a servo motor 58 through shaft 59 and from current supplied or controlled by servo amplifier 55 over leads 56—57. The servo motor 58 is driven in accordance with signals derived from a position indicating transducer such as potentiometer 45 mechanically coupled to tension arm 4 loaded by return spring 42 by means of links 43—44 and connected to a bias source battery 49 over leads 53 and 54. The signal to servo amplifier 55 is derived between the arm terminal 47 of potentiometer 45 and tap 50 on battery 49 over leads 51 and 52. When the tape is moved, the pull on the tension arm increases or decreases depending on the direction of motion of the tape and the reel is directed to counteract the motion thus imparted to the tension arms in order to keep their position constant and at the same time the tension on the tape constant.

It has been found that with the buffer vacuum loops established and controlled as described above, that the tape stops in an interval of time between 1 and 2 milliseconds with much less braking applied than has hitherto been required. A drag of a few ounces only is required say of the order of 3 oz. per brake shoe 10 or 13. It has been found, in addition, that even after prolonged operation that the tape moves freely in the vacuum chamber without tendency to cling to the chamber walls.

It will be seen that the two large ports 21 and 23 create the major component of pull on the tape and are responsible for the characteristics shown in FIG. 4 from line F to line B while the smaller ports 24–25–26–27 supply the smaller pull from line B to line C. The normal operation of the tape under steady conditions is at the intersection of the horizontal line with line E. If during starting or stopping of the tape, the pull is considerably reduced, then the operation takes place in the buffer region from line B to line C or somewhat beyond. The maximum at line A must be sufficient to prevent the tape from being pulled straight during sudden increases in pull. The bleed holes 29 are particularly important on the side of the chambers remote from the head where it is desired to have minimum drag.

While only a single embodiment of the present invention has been shown and described many modifications will be apparent to those skilled in the art and within the spirit and scope of the invention as set forth in the appended claims.

What is claimed is:

1. In a tape handling system, the combination of,
   a reproducer head,
   means for passing tape across said head including two drive capstans one on each side of said head, and tape handling means comprising,
   a vacuum chamber on each side of said head including a vacuum source, and
   tensioning means on each side of said head and beyond said vacuum chambers exerting a pull on said tape, wherein each of said vacuum chambers is formed with at least two ports and vented to said vacuum source to exert a pull on said tape passing therethrough, whereby the arrangement of said ports causes a relationship between the magnitude of the pull on said tape and distance of tape penetration into said chambers,
   wherein the magnitude of pull on said tape into said chambers is initially greater than the magnitude of pull of said tensioning means and as said penetration increases, the magnitude of pull on said tape decreases through a range including the magnitude of the pull of said tensioning means to a substantially constant magnitude after which, as said penetration continues further, the magnitude of pull on said tape drops to substantially zero.

2. In a tape handling system as set forth in claim 1 wherein said tensioning means includes at least one multiple loop tension arm device.

3. In a tape handling system with progressive control means including,
   a pair of reels for receiving and for paying out tape,
   a transducer head, a tape loop storage means to provide a predetermined tension in a tape between one of said reels and said head, tape driving means to drive tape in at least one direction between said reels, and a vacuum chamber on one side of said head, said vacuum chamber comprising, means forming an enclosure having a tape receiving opening, and means including a plurality of ports within said vacuum chamber, vacuum means connected to each of said ports to exert a pull on one side of a tape loop in said chamber, said ports being spaced apart so that the first of said ports to be reached by said loop as it penetrates into said chamber is traversed by said loop and vented to the other side of said loop as said penetration increases and a vacuum pull is still exerted on said one side from another of said ports after said loop is beyond said first port, whereby the magnitude of pull on said tape decreases at a predetermined irregular rate as the depth of penetration of said tape loop increases to a depth beyond said first port.

4. A tape handling system as set forth in claim 3 wherein said first port is characterized by an elongated dimension so that the magnitude of pull on said tape varies substantially as said tape loop traverses said dimension.

5. In a tape handling system, the combination of, a reproducer head, two drive capstans located one on each side of said head for passing tape across said head, a pair of reels for receiving and for paying out tape, tape tensioning devices adjacent said reels to provide a predetermined tension in a tape, and a vacuum chamber on each side of said reproducer head and positioned intermediate the drive capstans and the tape tensioning devices, each vacuum chamber comprising, means forming an enclosure having a tape receiving opening, and means including at least two ports in said enclosure means, one of said ports being substantially larger than the other for providing two substantially different components of pull on said tape, the magnitude of one of said components being at least equal to said predetermined tension, each of said ports including means for connection to a vacuum source.

6. In a tape handling system, the combination of, a reproducer head, means for passing tape across said head including two drive capstans one on each side of said head, a tape storage reel for holding tape on each side of said head, tape tensioning means adjacent each of said reels to provide a predetermined tension in a tape, and a vacuum chamber on each side of said reproducer head and positoned intermediate the drive capstans and the tape tensioning means, each of said vacuum chambers comprising, means forming an enclosure having a tape receiving opening and generally parallel inner opposite surfaces, means including at least two ports therein one of which is substantially larger than the other, and the larger port being located intermediate the extremities in depth of the enclosure and the smaller port being located generally at the lower extremity of the enclosure for providing two substantially different components of pull on said tape, each of said ports including means for connection to a vacuum source.

7. In a tape handling system as set forth in claim 6 wherein each said enclosure is characterized by a side toward said head and a side farther away from said head, and air bleed holes at least in said side farther away from said head to reduce drag on said tape against this last said side of each enclosure.

References Cited in the file of this patent

UNITED STATES PATENTS

| | | |
|---|---|---|
| 1,960,094 | Thurm | May 22, 1934 |
| 2,265,879 | Thurm | Dec. 9, 1941 |
| 2,710,153 | Baumrucker | June 7, 1955 |
| 2,778,634 | Gams et al. | Jan. 22, 1957 |
| 2,814,676 | House | Nov. 26, 1957 |
| 2,856,464 | Groom | Oct. 14, 1958 |
| 2,875,874 | Foret et al. | Mar. 3, 1959 |
| 2,952,010 | Demer et al. | Sept. 6, 1960 |
| 2,980,355 | Cannings | Apr. 18, 1961 |
| 3,016,207 | Comstock | Jan. 9, 1962 |

FOREIGN PATENTS

| | | |
|---|---|---|
| 1,163,105 | France | Apr. 21, 1958 |

OTHER REFERENCES

Publication, "Air Bearing For Magnetic Transducer," Geoffrey A. Hotham, I.B.M. Technical Disclosure Bulletin, vol. 1, No. 5, Feb. 1958.